Patented Feb. 18, 1947

2,416,191

UNITED STATES PATENT OFFICE 2,416,191

METHOD FOR THE PURIFICATION OF TITANIUM TETRACHLORIDE

Walter F. Meister, Elizabeth, N. J., assignor to National Lead Company, New York, N. Y., a corporation of New Jersey No Drawing. Application March 30, 1945,
Serial No. 585,812

4 Claims. (Cl. 23—87)

This invention relates to the purification of titanium tetrachloride.

This application is a continuation-in-part of co-pending application, Serial No. 457,971, filed September 11, 1942.

Titanium tetrachloride in its pure form is a water-white liquid. The commercial products, however, which are obtained by chlorination of various available titaniferous materials, such as rutile or residues obtained from the extraction of iron from titaniferous iron ores or of titaniferous iron ores, themselves, are invariably contaminated with impurities which are carried over with the titanium chloride vapors during the chlorination process. The crude condensate of titanium tetrachloride usually has a strong yellowish color.

The magnitude and type of contaminants which will be found in the condensed vapors from the chlorination operation will depend upon the purity of the titaniferous material used and the method of chlorination.

A study of the chlorides of the elements of the various groups of the periodic system reveals that there are a number of elements besides titanium which may be reacted with chlorine to form volatile chlorides which will be carried over with the titanium tetrachloride vapors during the chlorination operation. Some of these chlorides may be more or less easily separated from the titanium tetrachloride condensate; those that are in solid form at ordinary temperatures and insoluble in the tetrachloride by settling and filtration, or both, and those which are miscible with the tetrachloride by fractional distillation. However, a separation of solid chlorides from titanium tetrachloride seldom effects complete removal of the chlorides and depending upon the solubility of the respective chlorides they will be found in varying amounts as impurities in the titanium tetrachloride. Such impurities are not readily eliminated by distillation treatments because they tend to carry over with the vapors of titanium tetrachloride. Furthermore, fractional distillation to remove miscible chlorides is not completely satisfactory because depending upon the vapor pressure of the respective chlorides they will tend to distil over with the titanium tetrachloride and be found in the condensate. One such chloride which, because of the proximity of its boiling point to that of titanium tetrachloride, cannot be separated by fractional distillation is vanadium chloride. Among the chlorides of other elements which tend to distil over with the titanium tetrachloride may be mentioned those of silicon, phosphorus, antimony and sulfur. Many of the contaminating chlorides which, for the foregoing reasons, may be found in titanium tetrachloride, impart discoloration. This is particularly true of vanadium tetrachloride.

That the discoloring impurities cannot be eliminated from titanium tetrachloride by straight fractional distillation is well known, and various treatments for the elimination of such impurities, including vanadium have been proposed in the prior art. Thus, purification of titanium tetrachloride has been carried out by treatment with certain metals alone, such as iron in powder form or with sodium amalgam prior to distillation. It has, however, been found that such treatments are not entirely satisfactory, repeated treatments and distillations being necessary for a substantially complete removal of these impurities.

Other purifying treatments for titanium tetrachloride, such as with di- and trichloride of titanium, activated carbon, activated inorganic compounds such as alumina, silica, or titanium dioxide, and certain organic compounds capable of polymerization have recently been disclosed in the art.

It has now been discovered, according to the present invention, that impure titanium tetrachloride may be decolorized and purified in a single distillation operation to form a pure, water-white condensate by contacting the impure liquid with small amounts of alkali metal hydroxide, certain powdered metals and water.

Accordingly, it is among the objects of the present invention to produce in a single distillation a clear water-white, pure titanium tetrachloride. Other objects will be apparent from the following description.

According to the present invention, the impure titanium tetrachloride is mixed with a small amount of alkali metal hydroxide, e. g., sodium, potassium or lithium hydroxide, a small amount of a finely-divided metal preferably as a powder, e. g., iron, zinc, tin, copper and antimony, and a small amount of water. The mixture is heated under a reflux condenser at normal pressure. After sufficient time has elapsed for the treatment to take effect, the titanium tetrachloride is recovered by a single distillation. The distilled liquid is water-white and free of impurities.

In order to facilitate the operation, mechanical agitation may be employed, or dry, inert gases may be bubbled through the liquid during the treatment and subsequent distillation. Suspended and colloidal matter and dissolved gases which have not otherwise been removed should preferably be substantially eliminated by, for example, a fractional distillation prior to the treatment with alkali metal hydroxide, powdered metal and water. Because of the reactivity of titanium tetrachloride vapors with water, it is preferable to carry out the distillation in a dry atmosphere.

If so desired, my novel treatment may be carried out under more than atmospheric pressure. In that case, gaseous reaction products should preferably be eliminated prior to the application of pressure.

The time and temperature required for the treatment with the alkali metal hydroxide, powdered metal, and water depends upon the amount of impurities present in the liquid and the amount of treating agents used. Ordinarily when contacting the crude titanium tetrachloride with the treating mixture of alkali metal hydroxide, powdered metal and water at or about the temperature of boiling, i. e., about 136° C., a treatment time of from about one hour to about six hours is sufficient with an amount of treating mixture equal to about 4 to about 10 grams of alkali metal hydroxide, about 3 to about 20 grams of powdered metal and about 1 to about 5 grams of water per liter of titanium tetrachloride. The alkali metal hydroxide may be added as such or it may be dissolved in the water to be used in the treatment and used in the form of a concentrated aqueous solution. The treatment of this invention is very efficient, and a recovery of more than 95 per cent of the titanium tetrachloride is attained in the single treatment and distillation.

The residue containing the impurities which have been removed from the tetrachloride may be treated for the recovery of possible remaining titanium tetrachloride and residual values, such as those of nondistillable titanium compounds and other impurities, e. g., vanadium.

Having in the foregoing broadly described my invention, I shall now proceed further to illustrate its working with the aid of actual examples.

I. EXAMPLES SHOWING EFFICACY OF IRON, ZINC AND TIN

Seven portions of discolored commercial titanium tetrachloride containing 0.15 per cent vanadium calculated on the $TiO_2$ basis were placed in seven separate glass distillation apparatus and refluxed at about 136° C. in contact with alkali metal hydroxide, powdered metal and water, the respective metals and amounts used being shown in Table I, then distilled at normal pressure out of contact with objects other than glass and away from contact with the outside atmosphere.

The distillates were tested for vanadium and the color of the distillate was noted.

The following Table I contains the results obtained.

Table I

| Exp. No. | Alkali metal hydroxide, parts [1] | Powdered metal, parts [1] | Refluxing time at 136° C., hours | Color of distillate | Content of vanadium in distillate calculated on $TiO_2$, per cent |
|---|---|---|---|---|---|
| 1 | 1.0 (NaOH) | 0.5 Fe | 4 | Water-white | <.001 |
| 2 | 1.0 (NaOH) | 0.5 Zn | 4 | ___do___ | <.001 |
| 3 | 1.3 (KOH) | 0.5 Fe | 4 | ___do___ | <.001 |
| 4 | 0.38 (NaOH) in 0.38 $H_2O$ | 0.5 Fe | 4 | ___do___ | .002 |
| 5 | 1.3 (KOH) | 0.5 Zn | 4 | ___do___ | <.001 |
| 6 | 1.0 (LiOH.$H_2O$) | 0.5 Zn | 2 | ___do___ | .001 |
| 7 | 1.0 (NaOH) | 2.0 Sn (granulated) | 4 | ___do___ | .003 |

[1] By weight on the basis of 212.5 parts of crude $TiCl_4$.
N. B.—In all seven experiments, except No. 4, 0.2 part by weight of water were present.

II. EXAMPLES SHOWING EFFICACY OF COPPER AND ANTIMONY

Two portions of discolored commercial titanium tetrachloride containing 0.25 per cent vanadium calculated on the $TiO_2$ basis were placed in two separate glass distillation apparatus and refluxed at about 136° C. in contact with alkali metal hydroxide, powdered metal and water, the respective metals and amounts used being shown in Table I, then distilled at normal pressure out of contact with objects other than glass and away from contact with the outside atmosphere.

The distillates were tested for vanadium and the color of the distillate was noted.

The following Table II contains the results obtained.

Table II

| Exp. No. | Alkali metal hydroxide, parts [1] | Powdered metal, parts [1] | Refluxing time at 136° C., hours | Color of distillate | Content of vanadium in distillate calculated on $TiO_2$, per cent |
|---|---|---|---|---|---|
| 1 | 0.76 (NaOH) | 2.0 Sb | 4 | Water-white | .002 |
| 2 | 0.76 (NaOH) | 2.0 Cu | 4 | ___do___ | <.002 |

[1] By weight on basis of 174 parts of crude $TiCl_4$.
N. B.—In both experiments 0.76 part by weight of water was present.

The invention has in the foregoing been described in connection with certain details of operation and specific examples; it is, however, not intended that such description and examples shall be interpreted as imposing limitations upon its scope except insofar as they are not included in the accompanying claims, which should be interpreted as broadly as possible.

The invention has been described with reference to the treatment of titanium tetrachloride, but it should be understood that the other titanium halides, titanium tetrabromide and titanium tetrafluoride may be purified in similar manner.

I claim:

1. Method for purifying titanium tetrachloride, which comprises admixing with crude titanium tetrachloride small amounts of an alkali metal hydroxide, selected from the group consisting of sodium, potassium and lithium hydroxides, a finely-divided metal selected from the group consisting of zinc, iron, tin, antimony, and copper, and water, boiling the mixture under reflux conditions and then distilling the so-treated titanium tetrachloride.

2. Method for purifying titanium tetrachloride, which comprises admixing with crude titanium tetrachloride small amounts of an alkali metal hydroxide, selected from the group consisting of sodium, potassium and lithium hydroxides, a finely-divided metal selected from the group consisting of zinc, iron, tin, antimony, and copper, and water, the alkali metal hydroxide being between about 4 to about 10 grams, the finely-divided metal being between about 3 to about 20 grams and the water being between about 1 gram to about 5 grams, per liter of titanium tetrachloride, boiling the mixture under reflux conditions and then distilling the so-treated titanium tetrachloride.

3. Method for purifying titanium tetrachloride, which comprises admixing with crude titanium tetrachloride small amounts of an alkali metal hydroxide, selected from the group consisting of sodium, potassium and lithium hydroxides, a finely-divided metal selected from the group consisting of zinc, iron, tin, antimony, and copper, and water, the alkali metal hydroxide being between about 4 to about 10 grams, the finely-divided metal being between about 3 to about 20 grams and the water being between about 1 gram to about 5 grams, per liter of titanium tetrachloride, boiling the mixture under reflux conditions between about 1 hour and about 6 hours and then distilling the so-treated titanium tetrachloride.

4. Method for purifying titanium tetrachloride, which comprises admixing with crude titanium tetrachloride small amounts of sodium hydroxide, finely-divided iron metal and water, the sodium hydroxide being between about 4 to about 10 grams, the finely-divided iron metal being between about 3 to about 20 grams and the water being between about 1 gram to about 5 grams, per liter of titanium tetrachloride, boiling the mixture under reflux conditions between about 1 hour and about 6 hours and then distilling the so-treated titanium tetrachloride.

WALTER F. MEISTER.

REFERENCES CITED

The following references are of record in the file of this patent:

Mellor, "Inorganic & Theoretical Chemistry," vol. 7, pages 78 and 79, 1927.

Pamfilov, et al., "The Chemistry of Titanium," Chemical Abstracts, vol. 31, pages 4609–10.